US 9,146,399 B2

(12) United States Patent
Inoguchi et al.

(10) Patent No.: US 9,146,399 B2
(45) Date of Patent: Sep. 29, 2015

(54) OBSERVATION OPTICAL SYSTEM

(71) Applicant: CANON KABUSHIKI KAISHA, Tokyo (JP)

(72) Inventors: Kazutaka Inoguchi, Tokyo (JP); Masakazu Tohara, Komae (JP)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 13/971,567

(22) Filed: Aug. 20, 2013

(65) Prior Publication Data
US 2014/0055867 A1 Feb. 27, 2014

(30) Foreign Application Priority Data
Aug. 23, 2012 (JP) ................................. 2012-184011

(51) Int. Cl.
*G02B 27/14* (2006.01)
*G02B 27/01* (2006.01)
*G02B 5/30* (2006.01)

(52) U.S. Cl.
CPC ............. *G02B 27/0172* (2013.01); *G02B 5/30* (2013.01); *G02B 2027/015* (2013.01); *G02B 2027/0123* (2013.01)

(58) Field of Classification Search
CPC ...................................................... G02B 27/017
USPC .......................................................... 359/633
See application file for complete search history.

(56) References Cited

U.S. PATENT DOCUMENTS 7,616,382 B2 11/2009 Inoguchi et al.
7,864,459 B2 * 1/2011 Tohara et al. ................. 359/819

* cited by examiner

*Primary Examiner* — James Jones
(74) *Attorney, Agent, or Firm* — Canon USA, Inc. IP Division

(57) ABSTRACT

An observation optical system configured to guide light from a plurality of original images to an exit pupil to present a combined overall image of the plurality of original images, includes a first optical element including a first off-axial reflecting surface configured to reflect at least a portion of light, a second optical element including a second off-axial reflecting surface configured to reflect at least a portion of light, and a off-axial optical system which overlaps at the pupil light fluxes from positions on the respective original images that have an identical angle-of-view, wherein the second optical element is cemented with the first optical element in at least a portion of the first off-axial reflecting surface, and wherein the cemented surface is a surface which reflects at least a portion of light and transmits at least a portion of light.

13 Claims, 6 Drawing Sheets

OBSERVATION OPTICAL SYSTEM

BACKGROUND OF THE INVENTION

1. Field of the Invention

The present disclosure relates to an observation optical system which combines as an overall image a plurality of original images formed on image forming elements such as a liquid crystal display device (i.e., a liquid crystal panel), and enlarges and presents the overall image to an observer. In particular, an embodiment of the present invention relates to an observation optical system suitable for a head-mounted display (HMD).

2. Description of the Related Art

There is a demand with respect to the HMD for achieving a wide angle-of-view to increase realistic and dynamic sensation. On the other hand, it is desirable for the HMD to be small, and in particular, to be thin, in view of a balanced weight of the device. U.S. Pat. No. 7,864,459 discusses a thin-type observation optical system.

More specifically, U.S. Pat. No. 7,864,459 discusses separating two optical elements which configure the optical system, from each other. However, further improvements are required in thinning of the observation optical system and manufacturability including reducing time necessary for performing assembling adjustment.

SUMMARY OF THE INVENTION

An embodiment of the present invention is directed to an observation optical system in which further improvements are realized in thinning of the system and the manufacturability including reducing time necessary for performing assembling adjustment.

According to an aspect of the present invention, an observation optical system configured to guide light from a plurality of original images to an exit pupil to present a combined overall image of the plurality of original images, includes a first optical element including a first off-axial reflecting surface configured to reflect at least a portion of light, a second optical element including a second off-axial reflecting surface configured to reflect at least a portion of light, and an off-axial optical system configured to overlap at the pupil light fluxes from positions on the respective original images that have an identical angle-of-view, wherein the second optical element is cemented with the first optical element in at least a portion of the first off-axial reflecting surface, and wherein the cemented surface is configured to reflect at least a portion of light and transmit at least a portion of light.

Further features of the present invention will become apparent from the following detailed description of exemplary embodiments with reference to the attached drawings.

DESCRIPTION OF THE EMBODIMENTS

Various exemplary embodiments, features, and aspects of the invention will be described in detail below with reference to the drawings.

<The Observation Optical System>

Figure 1:
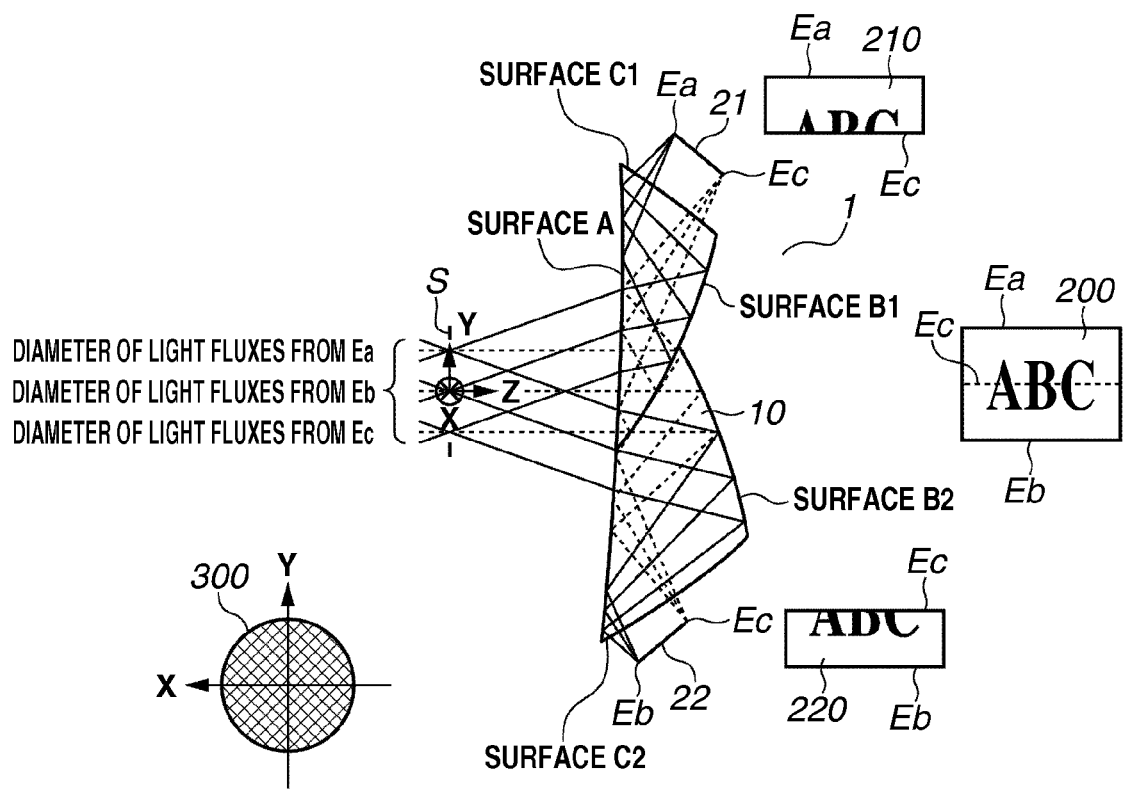
FIG. 1 is a schematic diagram illustrating a main portion of an observation optical system according to a first exemplary embodiment of the present invention.
Figure 2:
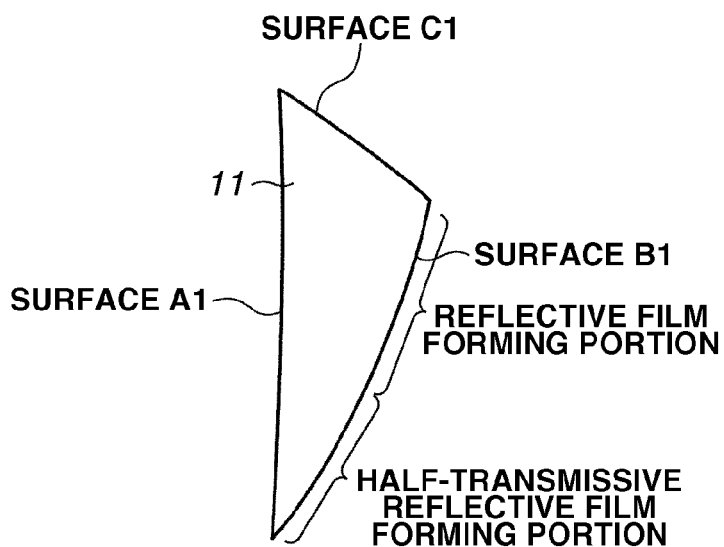
FIG. 2 illustrates a configuration of optical components according to the first exemplary embodiment.
Figure 2:
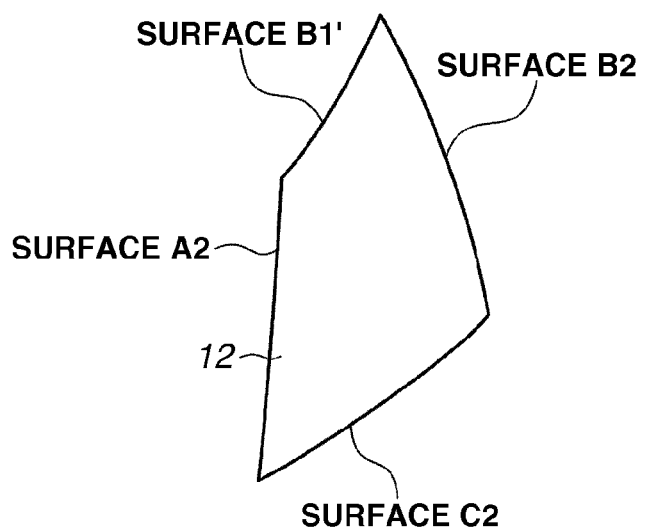

FIG. 1 is a schematic diagram illustrating a main portion of an observation optical system according to a first exemplary embodiment of the present invention. FIG. 2 illustrates a configuration of optical components according to the first exemplary embodiment. Referring to FIG. 1, an off-axial optical system 1 includes an optical element 10, a first display device 21 for displaying a first original image, and a second display device 22 for displaying a second original image. A pupil S corresponds to an exit pupil of the off-axial optical system 1. An original image 210 and an original image 220 respectively displayed on the display devices 21 and 22 are of the same size. Referring to FIG. 2, a first optical element 11 guides the light from the first display device 21 to the pupil S, and a second optical element 12 guides the light from the second display device 22 to the pupil S. The first optical element 11 and the second optical element 12 are cemented to form the optical element 10.

The first original image 210 is displayed on the first display device 21, the second original image 220 is displayed on the second display device 22, and an overall image 200 is the combined image presented to the observer via the off-axial optical system 1. An area 300 is the area in which the light fluxes from positions Ec on the first original image 210 and the second original image 220 overlap. More specifically, the positions Ec on the first original image 210 and the second original image 220 have the identical angle-of-view as viewed on a pupil plane of the pupil S, i.e., an X-Y cross-section.

<Optical Surfaces of the Off-Axial Optical System>

Each of the optical surfaces configuring the off-axial optical system 1 will be described below with reference to FIG. 2. The optical element 11 includes surfaces A1, B1, and C1 on an optical medium having a refractive index n, the optical element 12 includes surfaces A2, B2, C2, and B1' on the optical medium having the refractive index n. According to the present exemplary embodiment, a half-transmissive reflective film is formed on only a portion of the surface B1 (i.e., within a portion at which the surface B1 and the surface B1' are cemented). Further, a non-transmissive reflective film is formed on the portion above the portion in which the half-transmissive reflective film is formed on the surface B1. Furthermore, the non-transmissive reflective film is formed on the surface B2. The surface B1 corresponds to the first off-axial reflective surface, and the surface B2 corresponds to the second off-axial reflective surface.

The surfaces B1 and B1' in the optical elements 11 and 12 are cemented so that the surfaces A1 and A2 facing the pupil S are connected as one continuous surface. The optical elements 11 and 12 thus form the optical element 10 illustrated in FIG. 1. According to the present exemplary embodiment, a surface A of the optical element 10 in which the surfaces A1 and A2 are connected is configured as one surface defined by one equation.

By configuring the optical element 10 as described above, the surface A becomes a surface which transmits and reflects light, the surfaces B1 and B2 become surfaces that reflect at least a portion of the light, and the surfaces C1 and C2 only function as transmissive surfaces. Each of the surfaces are arranged as an off-axial curved surface with respect to each ray which forms an effective light flux that is guided to the pupil S having a pupil diameter necessary for observation from the respective display devices. More specifically, each of the surfaces is arranged as an off-axial curved surface with respect to a central angle-of-view principal ray. The central angle-of-view principal ray emerges from the position Ec on the original image 210 and the position Ec on the original image 220 corresponding to the central angle-of-view of the observation image 200, and reaches the center of the pupil S.

It is preferable that all of the above-described surface shapes are symmetrical with respect to a Y-Z cross-section, i.e., a cross-section of the off-axial optical system illustrated in FIG. 1. Since the surface then becomes definable using only shift decentering and tilt decentering on the Y-Z cross-section (i.e., rotation around an X-axis), designing, manufacturing, and inspection become easier to perform.

According to the present exemplary embodiment, a cross-section in which decentering of each surface of the optical system is definable using only the shift decentering and the tilt decentering on a cross-section will be referred to as a decentering section. Further, if all surfaces are defined by a rotationally asymmetrical shape in which the Y-Z cross-section is the only symmetry plane, decentering aberration caused by decentrally-arranging the curved surfaces can be corrected. The optical system which is both compact and has high optical performance can thus be configured. The optical element 10 is formed by cementing the optical elements 11 and 12 so that the above-described off-axial cross-sections are shared. As a result, unnecessary decentering aberration can be reduced, and the configuration can be simplified.

<The Effective Light Flux to the Pupil S>

Optical paths and effects of the effective light fluxes from the respective display devices 21 and 22 to the pupil S in the off-axial optical system 1 according to the present exemplary embodiment, will be described below. Referring to FIG. 1, the effective light fluxes from positions Ea and Ec on the first display device 21 enter the optical element 11 from the surface C1. The light fluxes then enter the surface A at an angle of arcsin (1/n) or greater, and are internally totally reflected by the surface A. The light fluxes which are internally totally reflected by the surface A are then reflected by the surface B1, enter the surface A at the angle of arcsin (1/n) or smaller, exit the optical element 11 from the surface A, and is guided to the pupil S.

On the other hand, the light fluxes from positions Eb and Ec on the second display device 22 enter the optical element 12 from the surface C2, enter the surface A at the angle of arcsin (1/n) or greater, and are internally totally reflected by the surface A. The light fluxes internally totally reflected by the surface A are reflected by the surface B2, enters the surface A at the angle of arcsin (1/n) or smaller, exits the optical element 11 from the surface A, and is guided to the pupil S. In such a case, the effective light fluxes from the positions Ec are transmitted through the half mirror portion of the surface B1, and exit the optical element 12 from the surface A. On the other hand, a portion of the light flux from the position Eb is transmitted through the half mirror portion of the surface B1, and the remaining portion reaches the surface A without being transmitted through the surface B1, and exits the optical element 12 from the surface A.

As described above, a portion of the light flux from the position Eb, other than the positions Ec corresponding to the central angle-of-view, is transmitted through the half mirror portion of the surface B1. As a result, when the observer focuses on the position Ea at an upper end of the overall image 200, there is non-uniformity in brightness. In such a case, if the observer rotates the eyes and focuses on the position Ea at the upper end of the overall image 200, the non-uniformity in brightness does not become a large problem for the following reason. The position Eb at the lower end of the entire image 200 where the light flux transmitted through the half mirror portion reaches is separated from the position Ea. However, it is desirable to perform a process for correcting such non-uniformity. For example, it is desirable to realize directionality characteristics in the light fluxes. More specifically, it is desirable that light intensity of the portion of the light flux from the position Eb at the lower end of the overall image 200, which exits in the direction to be transmitted through the half mirror, becomes greater than the light intensity of the portion which exits in the direction to be not transmitted through the half mirror.

According to the present exemplary embodiment, each ray in the light fluxes from the positions Ea and Eb is transmitted through or is reflected from the cemented surface only once, similarly as each ray in the light fluxes from the positions Ec on the respective original images 210 and 220 having the identical angle-of-view.

As described above, the optical paths from the two original images 210 and 220 are bent by the cemented off-axial optical system 1 including the plurality of off-axial reflecting surfaces, and guided to the pupil, so that the optical system is thinned. Further, the original image 210 displayed on the display device 21 and the original image 220 displayed on the display device 22 become an enlarged virtual image based on power of the respective curved surfaces in the optical element 10, and is recognized by the observer whose pupil is at the position on the pupil S. The enlarged visual image is thus recognized as the overall image 200 in which the two original images 210 and 220 are connected as one.

According to the present exemplary embodiment, the cemented portion of the surface B1 in the off-axial optical system 1 is formed as the half mirror. As a result, the light fluxes from the original images 210 and 220 corresponding to arbitrary points on a line indicated by a broken line in the overall image 200 illustrated in FIG. 1 are caused to overlap on the pupil S.

<An Area on the Pupil Plane in which the Light Fluxes Overlap and a Minimal Exit Pupil Shape>

The diameter of the pupil S, i.e., the exit pupil of the off-axial optical system 1, which is necessary for observation, will be described below in relation to the effective light flux. A radius of the pupil S, i.e., the exit pupil of the off-axial optical system 1, which is necessary for observation, is approximately Re×sin(ωD/2), wherein ωD is a maximum angle-of-view (i.e., a whole angle), and Re is a turning radius of the eyeball. More specifically, Re is a distance from a turning center of the eyeball to an entrance pupil of the eye, which is approximately 10 mm.

The maximum angle-of-view ωD with respect to the overall image 200 to be observed is generally a diagonal angle-of-view, so that the area 300 in which the light fluxes overlap on the pupil plane may be formed to cover the above-described radius and an appropriate additional length. According to the present exemplary embodiment, the light emerging from each of the points on the original images 210 and 220 and covering the area 300 becomes the "effective light flux".

Figure 3:
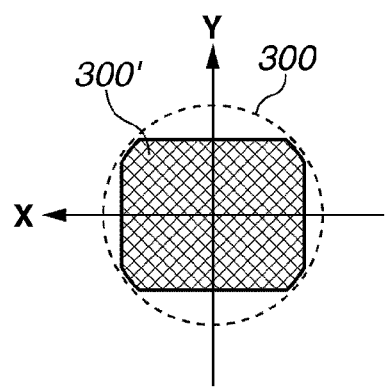
FIG. 3 illustrates a shape of an exit pupil (i.e., an effective exit pupil size) of an off-axial optical system.

FIG. 3 illustrates the shape of an exit pupil 300' of the off-axial optical system 1 which is the minimum shape required for observation (i.e., the effective exit pupil size). The angle-of-view in a horizontal direction (i.e., in the X-Z cross-section direction) and the angle-of-view in a vertical direction (i.e., in the Y-Z cross-section direction) are small as compared to the above-described maximum angle-of-view. As a result, a pupil range of the shape as illustrated in FIG. 3 (i.e., a rectangular range inscribed in a circle indicating the area 300 in which the light fluxes overlap on the pupil plane) becomes the minimal exit pupil shape to be formed by the effective light flux. When the angle-of-view (i.e., a full angle) in the X-Z cross-section direction is ωH, and the angle-of-view (i.e., a full angle) in the Y-Z cross-section direction is ωV, the size of the rectangular range becomes approximately $\pm Re \times \sin(\omega V/2)$ in the Y direction and $\pm Re \times \sin(\omega H/2)$ in the X direction.

The light fluxes from the corresponding positions Ec on the original images 210 and 220 that have the identical angle-of-view on the overall image 200 guide the light to cover the exit pupil 300'. As a result, an area displaying a portion of the first original image 210 which is identical with a portion of the second original image 220 can be caused to become zero. In other words, the complete overall image 200 becomes observable even in the case where the positions Ec on the respective original images having the identical angle-of-view are at the end portions of the original images, and there is no overlapping area between the original images.

In terms of the optical path cross-section, the light flux from the position Ec at the lower end of the display device 21 indicated by the broken line illustrated in FIG. 1 is reflected by the half-mirror portion of the surface B1 in which the optical elements 11 and 12 are cemented. On the other hand, the light flux from the position Ec at the upper end of the display device 22 indicated by the broken line is transmitted through the half-mirror portion, and forms the same overlapping area on the pupil S. In other words, both of the light fluxes from the position Ec on the lower end of the original image 210 and the position Ec on the upper end of the original image 220 having the identical angle-of-view (i.e., the identical center angle-of-view according to the present exemplary embodiment) on the overall image 200 to be observed, cover the exit pupil 300' effective for observation.

Similarly, both of the light fluxes from the positions Ea and Eb, which are different from the positions Ec that have the identical angle-of-view on the respective original images 210 and 220, cover the exit pupil 300' effective for observation.

As described above, the area 300 in which the light fluxes overlap is formed to be equivalent to or larger than the exit pupil 300'. As a result, natural observation can be constantly performed without a lack in the image, even if the pupil of the observer moves within the range. According to the present exemplary embodiment, the complete overall image can be constantly observed even when the area in which a portion of the original image 210 identical with a portion of the original image 220 is displayed is 0. An image of a resolution effectively using pixels of the display devices 21 and 22 can thus be observed.

As a result, a wide angle-of-view becomes easily realized as compared to a conventional method in which there is a large area of the identical portion between the two original images. In other words, if the same angle-of-view is to be acquired as the angle-of-view according to the conventional method in which there is a large area of the identical portion between the two original images, a focal length can be increased. Since little aberration is then generated, high optical performance can be realized, and the optical system of low sensitivity and tolerance can be achieved.

According to the present exemplary embodiment, a rigid optical system is configured by cementing the two optical elements, so that less time is necessary for performing assembling adjustment, and manufacturing becomes easy. Further, according to the present exemplary embodiment, the half mirror is formed to cover the portion through which the effective light fluxes from the positions Ec, corresponding to a boundary of the two original images, are transmitted. A cemented portion is thus set to include such a half mirror portion, so that the off-axial optical system 1 can be thinned.

The present exemplary embodiment is not limited to the above-described configuration. For example, according to the present exemplary embodiment, both the optical elements 11 and 12 have the same refractive index n. However, the optical elements 11 and 12 may have different refractive indices, i.e., n1 and n2. If the optical elements 11 and 12 have the same refractive index n, discontinuity of light becomes less likely to occur between the light fluxes reflected by the surface B2 which then directly reach the surface A and which then reach the surface A after being transmitted through the surface B1. It is thus more preferable for the optical elements 11 and 12 to have the same refractive index n.

Further, the reflective film is not limited to be configured as described above. For example, the half-transmissive reflective film may cover the entire surface B1 and surface A2. In such a case, light use efficiency is lowered. However, since there is no restriction on an entrance angle when the effective light flux is reflected by the surface A, design possibility is increased, and high optical performance becomes easier to achieve. Furthermore, a difference in the amount of light generated by the light flux being transmitted through the half-mirror portion of the surface B1 and the light flux not being transmitted through the half-mirror portion generated according to the present exemplary embodiment can be decreased. The non-uniformity in the brightness of the observation image due to the pupil position can thus be reduced.

Moreover, the light from the display device 21 may be set as S-polarized light, the light from the display device 22 as P-polarized light, and the cemented portion of the surface B1 as a polarization beam splitter (PBS). In such a case, the light amount difference generated between the light fluxes being transmitted through the half-mirror portion of the surface B1 and not being transmitted through the half-mirror portion can be decreased. The non-uniformity in the brightness of the observation image according to the pupil position can thus be reduced.

Further, according to the present exemplary embodiment, all surfaces of the off-axial optical system 1 is a curved surface. However, a portion of the surfaces may be a plane surface. If all surfaces are curved surfaces, the surfaces not necessary for forming the image and correcting aberration can be reduced, and high performance becomes easier to achieve. It is thus preferable for all surfaces to be a curved surface.

Similarly, a portion of the surfaces may be surfaces that are not off-axial with respect to the central angle-of-view or other angle-of-view principal ray, or the rotationally symmetrical surface may be employed as a portion of the surface shape. If all of the surfaces are off-axial and rotationally asymmetrical surfaces, an optical system of high design possibility and high performance becomes easier to configure. In contrast, if a portion of the surfaces is not off-axial or is rotationally symmetrical, such a surface may be used as a measurement standard, so that production and evaluation of the optical element become easier to perform.

Further, according to the present exemplary embodiment, the surface A is defined by one equation. However, the surfaces A1 and A2 may be defined by different equations. In such a case, the surfaces A1 and A2 may be continuously configured by setting X, Y, and Z coordinate values of the surfaces A1 and A2 at the boundary portion, and first-order and second-order differentials of the surfaces A1 and A2 to be the same.

Furthermore, according to the present exemplary embodiment, the central angle-of-view in the X-Z cross-section direction (i.e., horizontal direction) is on the Y-Z cross-section. However, the central angle-of-view may be displaced. If the central angle-of-view in the X-Z cross-section direction is on the Y-Z cross-section, a compact optical system can be realized and is thus more preferable.

Figure 4:
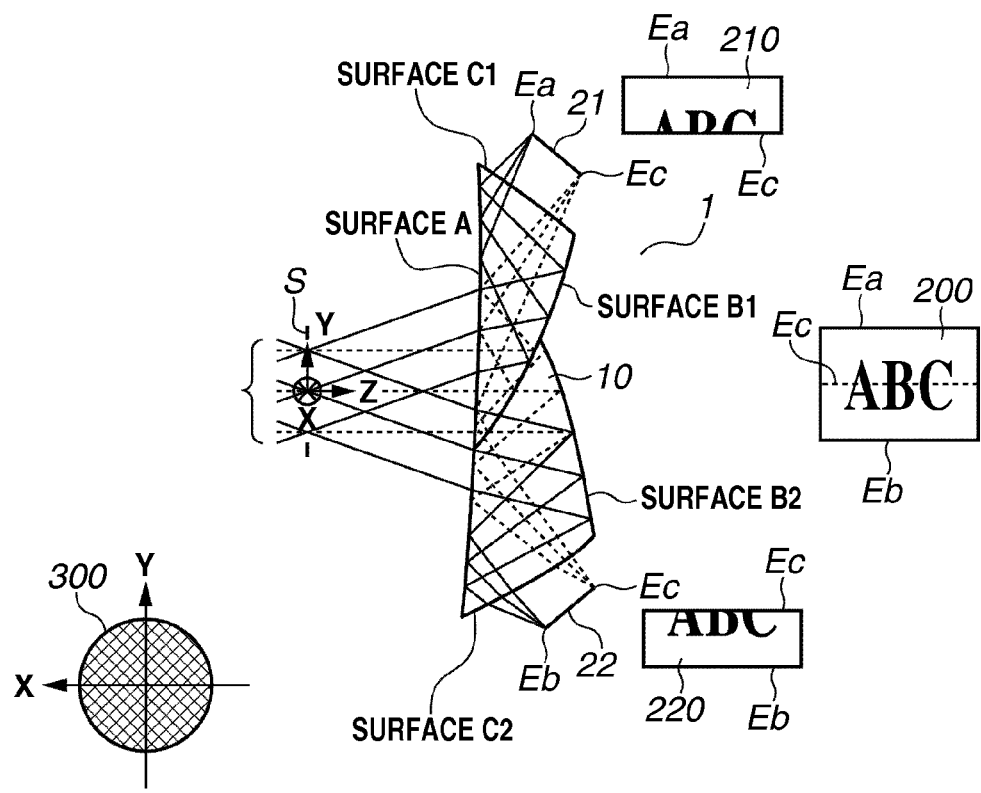
FIG. 4 is a schematic diagram illustrating a main portion of an observation optical system according to a second exemplary embodiment of the present invention.

FIG. 4 is a schematic diagram illustrating the main portion of an observation optical system according to a second exemplary embodiment of the present invention. The present exemplary embodiment is different from the first exemplary embodiment as follows. A portion of the light flux emerging from the upper end of the display device 22 in the Y-Z cross-section, i.e., the optical path cross-section, which reaches the area effective for observation in the pupil S, i.e., the exit pupil, is transmitted through the cemented half-mirror portion of the surface B1 a plurality of times. Other configurations and the reference numerals are the same as those according to the first exemplary embodiment, and the descriptions thereof will thus be omitted.

As described with reference to FIG. 2, the surfaces B1 and B1' in the optical elements 11 and 12 are cemented so that the surfaces A1 and A2 are connected as one continuous surface. The optical elements 11 and 12 thus form the optical element 10. The effective light flux from the first display device 21 enters the optical element 11 from the surface C1. The light flux is then internally totally reflected to enter the surface A at an angle of arcsin (1/n) or greater. The light flux which is internally totally reflected by surface A is then reflected by surface B1, enters the surface A at the angle of arcsin (1/n) or smaller, exits the optical element 11 from the surface A, and is guided to the pupil S.

The light from the second display device 22 enters the optical element 12 from the surface C2, and is internally totally reflected to enter the surface A at an angle of arcsin (1/n) or greater. In such a case, a portion of the light flux from the position Ec, corresponding to the upper end portion of the original image 220, is transmitted through the half-mirror portion of the surface B1 from the surface C2, and internally totally reflected by the surface A. The light flux internally totally reflected by the surface A is reflected by the surface B2, enters the surface A at an angle of arcsin (1/N) or smaller, exits the optical element 11 from the surface A, and is guided to the pupil S.

The light which is transmitted through (first transmission) the half-mirror portion of the surface B1 from the surface C2, and internally totally reflected by the surface A, is then transmitted through (second transmission) the half-mirror portion of the surface B1, and reflected by the surface B2. The light is then transmitted through (i.e., third transmission) the half-mirror portion of the surface B1, and exits the optical element 12 from the surface A. Further, a portion of the light flux from the other position Eb on the original image 220 is transmitted through the half-mirror portion of the surface B1, and the remaining portion reaches the surface A without being transmitted through the surface B1.

In terms of the optical path cross-section, the light flux from the position Ec at the lower end of the display device 21 is reflected by the half-mirror portion of the surface B1 at which the optical elements 11 and 12 are cemented. Further, the light flux from the position Ec at the upper end of the display device 22 is transmitted through the half-mirror portion. The light fluxes thus overlap on the same pupil diameter. In other words, both light fluxes from the points on the lower end of the original image 210 and the upper end of the original image 220 that have the identical angle-of-view on the observation image, form the area 300 in which the light fluxes overlap, to cover the pupil diameter effective for observation. As a result, natural observation can be constantly performed without a lack in the image, even if the pupil of the observer moves within the range.

The complete overall image can thus be constantly observed even when the area in which a portion of the original image 210 identical with a portion of the original image 220 is displayed is 0, so that an image of the resolution effectively using the pixels of the display devices 21 and 22 can be observed.

According to the present exemplary embodiment, a portion of the light from the display device 22 is transmitted three times through the half-mirror portion of the surface B1 at which the optical elements 11 and 12 are cemented, as indicated by the ray illustrated by a bold broken line in FIG. 4. As a result, if the pupil of the observer is positioned above the pupil S, i.e., the exit pupil of the optical system, the brightness is lowered at the boundary of the original images 210 and 220. However, if the pupil of the observer is positioned above the pupil S, the observer is generally focusing on the upper end portion of the image 200, so that lowering of the brightness at the center of the image may be hardly troublesome such as in the case where the angle-of-view is wide.

According to the present exemplary embodiment, the off-axial optical system is particularly thinned by causing a portion of the effective light flux to be transmitted through the half-mirror portion three times, and improving a degree-of-freedom in the arrangement of the surface B2. Further, the display device 22 may have a light amount distribution according to a position and an angle for causing the light intensity of the light flux emerging from the upper end of the original image 220 towards an upper side of the pupil plane to become higher than that of the other light fluxes. Correction may then be performed.

Furthermore, the light from the display device 21 may be set as the S-polarized light, the light from the display device 22 as P-polarized light, and the cemented portion of the surface B1 as the PBS. In such a case, an amount of loss of light which is transmitted through the cemented portion of the surface B1 can be reduced, so that the light amount difference between the light transmitted through the cemented portion of the surface B1 a plurality of times and the light transmitted through the cemented portion only once can be decreased. The non-uniformity in the brightness of the observation image according to the pupil position can thus be reduced.

Moreover, the non-uniformity in the brightness in the image according to the pupil position, including the non-uniformity caused by the light amount difference between the light transmitted through the cemented portion of the surface B1 a plurality of times and the light transmitted through the cemented portion only once, may be corrected as follows. The non-uniformity may be corrected by causing light having directional characteristics for correcting the non-uniformity to emerge from the display device.

Figure 5:
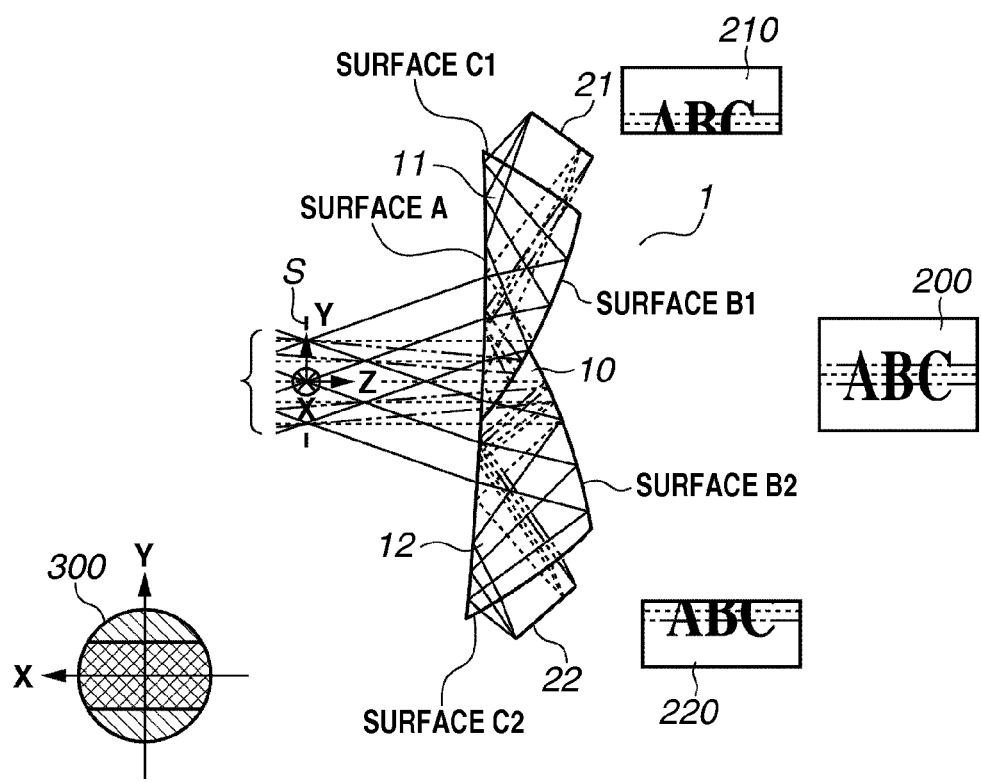
FIG. 5 is a schematic diagram illustrating a main portion of an observation optical system according to a third exemplary embodiment of the present invention.

FIG. 5 is a schematic diagram illustrating the main portion of an observation optical system according to a third exemplary embodiment of the present invention. The present exemplary embodiment is different from the first exemplary embodiment as follows. There is an identical area in both of the original images 210 and 220 respectively displayed by the display devices 21 and 22. The light fluxes from the display devices 21 and 22 of the area displaying the identical portion are then partially overlapped on the pupil. In other words, the positions on the original images 210 and 220 that have the identical angle-of-view are located more inward as compared to the edge portion positions on the respective original images. Other configurations and the reference numerals are the same as those according to the first exemplary embodiment, and the descriptions thereof will thus be omitted.

The light from the first display device 21 enters the optical element 11 from the surface C1, is reflected by the surface A and then by the surface B1, exits the optical element 11 from the surface A, and is guided to the pupil S. In such a case, the light flux from the portion corresponding to the lower end of the original image 210 is reflected by only the half-mirror portion in the surface B1. On the other hand, a portion of the light fluxes of other angles-of-view is reflected by the mirror portion of the surface B1, and the remaining portion is reflected by the half-mirror portion of the surface B1.

The light from the second display device 22 enters the optical element 12 from the surface C2, is reflected by the surface A towards the surface B2, is reflected by the surface B2, exits the optical element 12 from the surface A, and is guided to the pupil S. In such a case, the light flux from the portion corresponding to the upper end of the original image 220 is transmitted through the half-mirror portion of the surface B1 and reaches the surface A. In contrast, a portion of the light fluxes of other angles-of-view is transmitted through the half-mirror portion of the surface B1, and the remaining portion reaches the surface A without being transmitted through the surface B1. More specifically, all rays of the light flux emerging from the upper end of the display device 22 and reaching the area in the exit pupil S which is effective for observation are transmitted through the half-mirror portion of the surface B1 only once.

As a result, according to the present exemplary embodiment, the light fluxes from the positions having the identical angle-of-view are overlapped on the pupil in only a portion of the effective exit pupil diameter instead of covering the entire diameter, even if there are identical portions displayed on the two original images 210 and 220. The half-mirror portion is thus further reduced, and a thinner and smaller observation optical system as compared to the first exemplary embodiment is realized.

Further, a wide angle-of-view becomes easier to achieve as compared to the conventional case in which the light fluxes from the plurality of original images that have the identical angle-of-view are not overlapped on the pupil. In such a case, the effect may be less than the effect achieved in the first exemplary embodiment. In contrast, if the same angle-of-view is to be acquired as in the conventional method, the focal length can be increased, so that little aberration is generated and high optical performance can thus be realized. Further, the optical system of low sensitivity and tolerance can be acquired.

Figure 6:
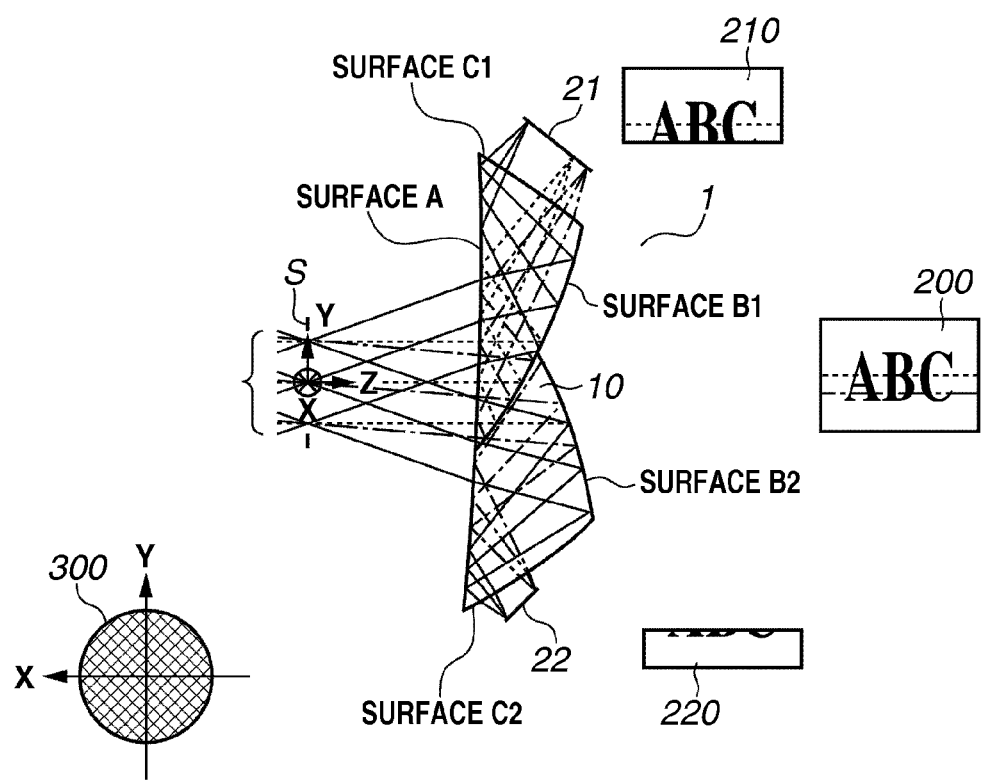
FIG. 6 is a schematic diagram illustrating a main portion of an observation optical system according to a fourth exemplary embodiment of the present invention.

FIG. 6 is a schematic diagram illustrating the main portion of an observation optical system according to a fourth exemplary embodiment of the present invention. The present exemplary embodiment is different from the first exemplary embodiment in that the sizes of the original images 210 and 220 displayed on the display devices 21 and 22 are different. In other words, according to the first exemplary embodiment, the sizes of the original images 210 and 220 displayed on the display devices 21 and 22 are the same. Other configurations and the reference numerals are the same as those according to the first exemplary embodiment, and the descriptions thereof will thus be omitted.

The light from the first display device 21 enters the optical element 11 from the surface C1, is reflected by the surface A and then by the surface B1, exits the optical element 11 from the surface A, and is guided to the pupil S. In such a case, the light flux from the portion corresponding to the lower end of the original image 210 is reflected by only the half-mirror portion in the surface B1. On the other hand, a portion of the light fluxes of the other angles-of-view is reflected by the mirror portion of the surface B1, and the remaining portion is reflected by the half-mirror portion of the surface B1.

The light from the second display device 22 enters the optical element 12 from the surface C2, is reflected by the surface A towards the surface B2, is reflected by the surface B2, exits the optical element 12 from the surface A, and is guided to the pupil S. In such a case, the light flux from the portion corresponding to the upper end of the original image 220 is transmitted through the half-mirror portion of the surface B1 and reaches the surface A. In contrast, a portion of the light fluxes of other angles-of-view is transmitted through the half-mirror portion of the surface B1, and the remaining portion reaches the surface A without being transmitted through the surface B1. More specifically, all rays of the light flux emerging from the upper end of the display device 22 and reaching the area in the exit pupil S which is effective for observation are transmitted through the half-mirror portion of the surface B1 only once.

As a result, according to the present exemplary embodiment, the size of the second original image 220 is decreased as compared to the first original image 210, so that the second optical element 12 is thinned. The observation optical system in which the thickness of the entire optical system is thinner as compared to the first exemplary embodiment is thus realized.

According to the present exemplary embodiment, reflectivity and transmissivity of the half-mirror portion are not limited to 50%, and may be different values (e.g., the reflectivity is 60% and the transmissivity is 40%). Further, the half-mirror may also absorb the light.

Furthermore, the vertical and horizontal directions in observing the overall image 200 are respectively set to the X-Z cross-section direction and the Y-Z cross-section direction. However, the horizontal direction may be the Y-Z cross-section direction, and the vertical direction may be the X-Z cross-section direction.

As described above, according to the exemplary embodiments of the present invention, the observation optical system which is thinned and the manufacturability including time necessary for performing assembling adjustment has been further improved can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-184011 filed Aug. 23, 2012, which is hereby incorporated by reference herein in its entirety.

What is claimed is:

1. An observation optical system comprising:
    a first optical element including a first curved reflection surface configured to guide first image light from a first image display element to a pupil; and
    a second optical element including a second curved reflection surface configured to guide second image light from a second image display element to the pupil, and a bonding surface different from the second curved reflection surface, wherein a part of the first curved reflection surface and the bonding surface of the second optical element are bonded together, and wherein the second curved reflection surface is configured to:

guide a part of the second image light to the pupil via the bonding surface, and guide the other part of the second image light to the pupil not via the bonding surface and the first optical element.

2. The observation optical system according to claim 1, wherein respective surfaces of the first optical element and the second optical element which are facing the pupil form one continuous surface.

3. The observation optical system according to claim 1, wherein each ray in light fluxes from positions on the respective original images that have the identical angle-of-view is transmitted through or is reflected by the cemented surface only once.

4. The observation optical system according to claim 1, wherein the off-axial optical system overlaps, on the pupil, light fluxes from positions other than the positions on the respective original images that have the identical angle-of-view.

5. The observation optical system according to claim 1, wherein the first optical element and the second optical element have the same refractive index.

6. The observation optical system according to claim 1, wherein the positions on the respective original images that have the identical angle-of-view are end portion positions on the respective original images.

7. The observation optical system according to claim 1, wherein the positions on the respective original images that have the identical angle-of-view are positions which are more inward from the end portion positions on the respective original images.

8. The observation optical system according to claim 1, wherein angle-of-view ranges, including the identical angle-of-view, of the plurality of original images are equivalent to each other.

9. The observation optical system according to claim 1, wherein angle-of-view ranges, including the identical angle-of-view, of the plurality of original images are different from each other.

10. An observation optical apparatus comprising:

a plurality of image forming elements configured to form a plurality of original images, respectively; and an observation optical comprising:

a first optical element including a first curved reflection surface surface configured to guide first image light from a first image display element to a pupil; and a second optical element including a second curved reflection surface configured to guide second image light from a second image display element to the pupil, and a bonding surface different from the second curved reflection surface wherein a part of the first curved reflection surface and the bonding surface of the second optical element are bonded together, and wherein the second curved reflection surface is configured to:

guide a part of the second image light to the pupil via the bonding surface, and guide the other part of the second image light to the pupil not via the bonding surface and the first optical element.

11. The observation optical system according to claim 1, wherein the first curved reflection surface is configured to:

guide a part of the first image light to the pupil via a bonding area in the first curved reflection surface brought into contact with the bonding surface of the second optical element, and guide the other part of the first image light to the pupil not via the bonding area.

12. The observation optical system according to claim 1, wherein the first optical element is configured to reflect the first image light twice using two surfaces thereof and then guide the first image light to the pupil, and wherein the second optical element is configured to reflect the second image twice using two surfaces thereof and then guide the second image light to the pupil.

13. A head-mount display, comprising:

a first image display element;

a second image display element; and an observation optical system for guiding first image light from the first image display element and second image light from the second image display element to a pupil, the observation optical system comprising:

a first optical element including a first curved reflection surface configured to guide the first image light to the pupil; and a second optical element including a second curved reflection surface configured to guide the second image light to the pupil, and a bonding surface different from the second curved reflection surface, wherein a part of the first curved reflection surface and the bonding surface of the second optical element are bonded together, and wherein the second curved reflection surface is configured to:

guide a part of the second image light to the pupil via the bonding surface, and guide the other part of the second image light to the pupil not via the bonding surface and the first optical element.

\* \* \* \* \*